Nov. 2, 1965 W. V. SMITH ETAL 3,215,819

MEMORY SYSTEM

Filed May 29, 1961 3 Sheets-Sheet 1

INVENTORS
HAROLD E. PETERSEN
WILLIAM V. SMITH

BY Elmer Galliati

AGENT

Nov. 2, 1965 W. V. SMITH ETAL 3,215,819

MEMORY SYSTEM

Filed May 29, 1961 3 Sheets-Sheet 2

United States Patent Office 3,215,819

Patented Nov. 2, 1965

3,215,819

MEMORY SYSTEM

William V. Smith, Leende, North Brabant, Netherlands, and Harold E. Petersen, Chappaqua, N.Y., assignors to International Business Machines Corporation, New York, N.Y., a corporation of New York Filed May 29, 1961, Ser. No. 113,388
9 Claims. (Cl. 235—61.11)

This invention relates to data memories and, more particularly, to a data memory wherein the information is stored in punched hole data cards and wherein the data is read by passing light through the holes in the data cards.

Reading punched hole data cards by means of light is well known. The prior art shows systems wherein a punched hole data card is indexed between a light source and a plurality of photoreceptors. The light source is then activated and those photoreceptors beneath holes produce output signals. Systems of the type described above generally only have provision for reading one card (or a part of one card) at any one time. Other cards (or other parts of the same card) are read by moving the first card away from the reading station and moving the next card (or another part of the same card) to the reading station.

By mere duplication of parts in a system of the type described above, provision could be made for reading a plurality of cards without physically moving any card; however, when this is done a large amount of gating circuitry is required in order to selectively read any particular data in the memory.

In the present invention the amount of gating circuitry is reduced by having a matrix of photoreceptors associated with each data card, and in addition having the matrices which are associated with the various data cards interconnected into a larger matrix. In order to distinguish the smaller matrices from the larger matrices of which they form a part, the smaller matrices are hereinafter called submatrices. Each data card is illuminated by a separate light source and these light sources are activated by a matrix of panel drive lines. The result is that there are a plurality of memory cells each of which comprises a light source, a data card, and a submatrix of photoreceptors. In order to read information from the memory, the memory cell is activated by activating one of the light sources through the matrix of panel drive lines and then the appropriate photoreceptors in the submatrix are addressed by interrogating the appropriate lines in the larger matrix.

An object of the present invention is to provide an improved large capacity data memory wherein information is stored in punched hole data cards.

Another object of the present invention is to provide a system for interrogating a punched hole data card memory without using a large amount of gating circuitry.

Yet another object of this invention is to provide a system consistent with the above objects, which has a small number of output lines.

Still another object of the present invention is to provide a practical, economical, and compact large-capacity punched hole data card memory.

Another object of the present invention is to provide a punched hole data card memory which is capable of random access three dimensional addressing of data words.

A further object of this invention is to provide a punched hole data card memory which is capable of random access four dimensional addressing of data bits.

One of the features of novelty of the present invention is the manner in which the various memory cells are interrelated and interconnected in order to provide access to information in the memory without the use of a large amount of gating circuitry.

The foregoing and other objects, features and advantages of the invention will be apparent from the following more particular description of preferred embodiments of the invention as illustrated in the accompanying drawings.

Figure 5A:
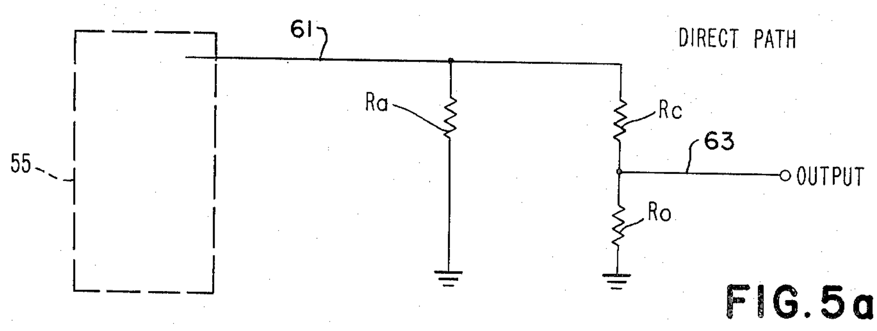
Figure 5B:
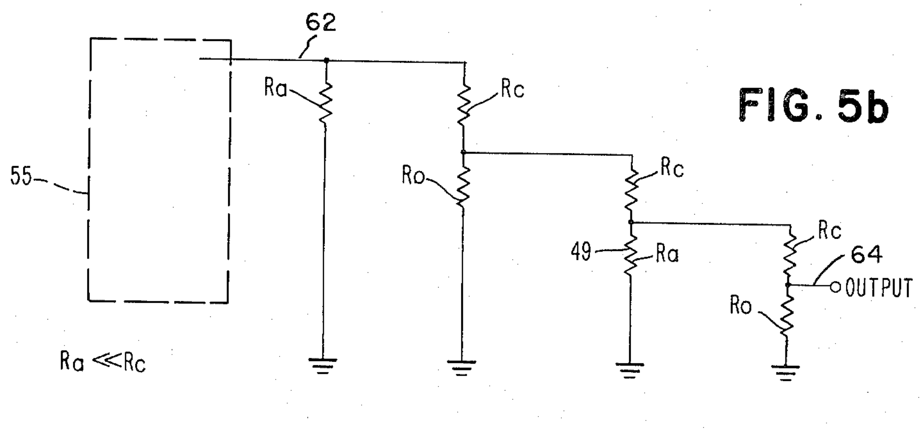

FIGURES 5*a* and 5*b* are circuit diagrams useful in explaining operation of the invention.

Figure 1:
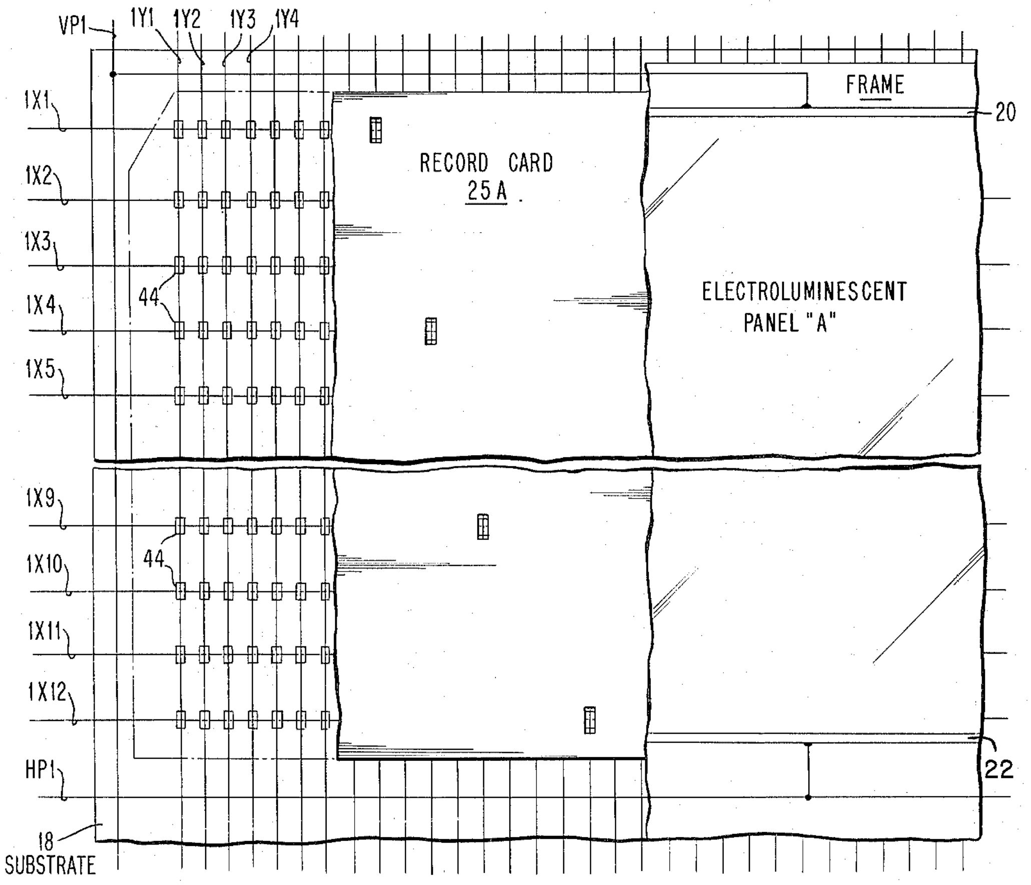
FIGURE 1 is a detailed view of one subassembly photoreceptor matrix, the associated punched hole data card, and the associated electroluminescent panel.
Figure 2:
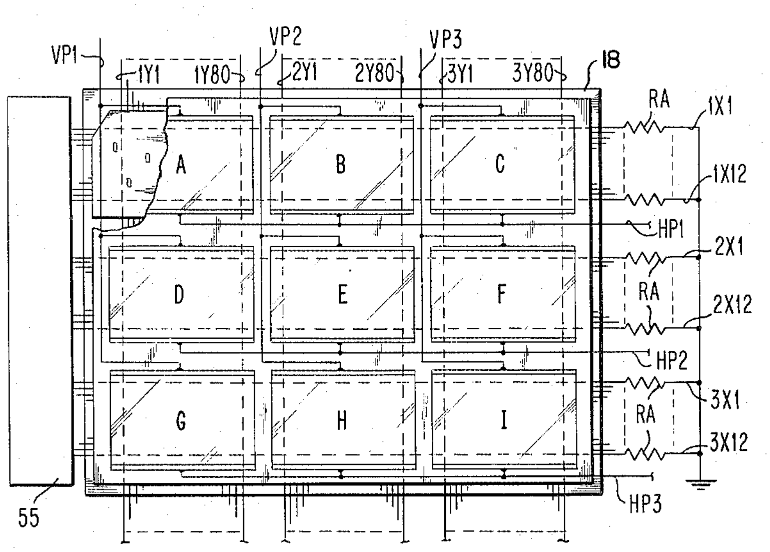
FIGURE 2 is a partially cut-away overall view of a first embodiment of the invention.

The first embodiment of the invention as shown in FIGURE 2, has nine data cards, each of which is located between a substrate 18 and one of nine electroluminescent panels A through I. Substrate 18 has 240 vertical conductors and 36 horizontal conductors thereon. The vertical conductors are divided into three groups, each group having eighty conductors, and the horizontal conductors are divided into three groups each having twelve conductors. These groups of conductors correspond to the three vertical and horizontal rows of data cards. Each vertical conductor is connected to each horizontal conductor by a photoreceptor. FIGURE 1 shows a representative section of the photoreceptor matrix circuitry on substrate 18 in detail.

The photoreceptors (such as photoreceptor 44 for example) which interconnects the various matrix lines are light responsive resistors (photoresistors) which have a low resistance when illuminated and a high resistance when dark. An illuminated photoresistor provides a low resistance path between the associated matrix lines, whereas a nonilluminated or dark photoresistor merely provides a high resistance path between the associated lines. It should be noted that in the following discussion that the vertical conductors, the horizontal conductors and the photoreceptors associated with each of the electroluminescent panels A through I will be referred to as a subassembly photoresistor matrix. Hence, FIGURE 2 shows nine subassembly photoresistor matrices and FIGURE 1 shows a portion of one subassembly photoresistor matrix. Each subassembly photoresistor matrix, the associated record card and the associated electroluminescent panel form a memory cell.

Any one of the electroluminescent panels, A through I, can be illuminated by applying an electrical potential between two associated electrodes. For example, electroluminescent panel A may be activated by the application of a potential between electrodes 20 and 22. A two dimensional matrix arrangement of panel drive lines provides means for selectively applying potentials to the various electroluminescent panel electrodes. There are three horizontal panel drive lines, HP1, HP2, and HP3, respectively connected to electrodes on the electroluminescent panels in the first, second and third horizontal rows of panels. There are also three vertical panel drive lines VP1, VP2, and VP3, respectively connected to electrodes on the electroluminescent panels in the first, second, and third vertical column of panels. Hence, application of a voltage between one horizontal panel drive line and one vertical panel drive line activates one electroluminescent panel.

Each data card has eighty columns and twelve rows of index positions where data representing holes may be punched. The information contained in one horizontal row of index position on each card is a "data word."

The various photoresistors are located so that each photoresistor is illuminated by the associated electroluminescent panel if there is a hole in the data card at some particular index position. Hence, each photoresistor is aptly described as being located in proximity to the associated data hole.

The conductors or matrix lines which interconnect the photoresistors are designated by a three digit symbol, for example 1X1. The first numeral in the designation indicates which row or column of memory cells (i.e. the first row of memory cells including panels A, B and C, the second row including panels D, E and F, etc.) the particular line is associated with. The letter (X or Y) designates whether the line is a horizontal or a vertical line, and the final numeral indicates the position of the line in its associated column or row of memory cells. For example, line 2Y80 designates the eightieth vertical conductor associated with the second column of memory cells. It should be noted that in FIGURE 2, for ease of illustration, only the first and last vertical and the first and last horizontal conductor associated with each column and row of memory cells is shown.

Information is read out of the memory by selectively applying a voltage between one of the horizontal panel drive lines (HP1, HP2 or HP3) and one of the vertical panel drive lines (VP1, VP2 or VP3) thereby illuminating one of the electroluminescent panels A through I. After the selected panel has been illuminated, a voltage is applied to selected horizontal photoresistor matrix lines by circuit 55 and the vertical photoresistor matrix lines are sensed by circuit 56 (see FIGURE 4).

An information word (i.e. a row of information from one card) is addressed for read out by a three dimensional selection. The dimensions or parameters in the address are (1) the designation of a horizontal panel drive line (2) the designation of a vertical panel drive line and (3) the designation of a horizontal photoresistor matrix line. A voltage is applied between the two selected panel drive lines (1 and 2 above) to illuminate one of the electroluminescent panels and then a voltage is applied to a selected horizontal photoresistor matrix drive line. The information outputs appear as the presence or absence of voltages on the vertical photoresistor matrix lines.

A particular bit of information can be addressed by adding another dimension or parameter to the three described above. The added dimension is the specification of one particular vertical photoresistor matrix line.

It should be noted that there is a certain amount of redundancy in the specification of addresses. The designation of vertical and horizontal photoconductor matrix lines actually specifies the location of a data bit in the memory; however, in the present invention the additional designation of a vertical and a horizontal panel drive line is necessary. The reason for this is to increase the signal to noise ratio of the memory, that is, to increase the ratio between the magnitude of a signal which indicates information and the magnitude of a noise or spurious signals which do not indicate the presence of information.

The noise signals are present because of "sneak paths" througth the memory. The nature of "sneak paths" and how their effect is minimized by attenuating resistors R$a$, which connect each horizontal photoresistor matrix line to ground, will now be explained with reference to the portion of the photoresistor matrix shown in FIGURE 4.

Figure 4:
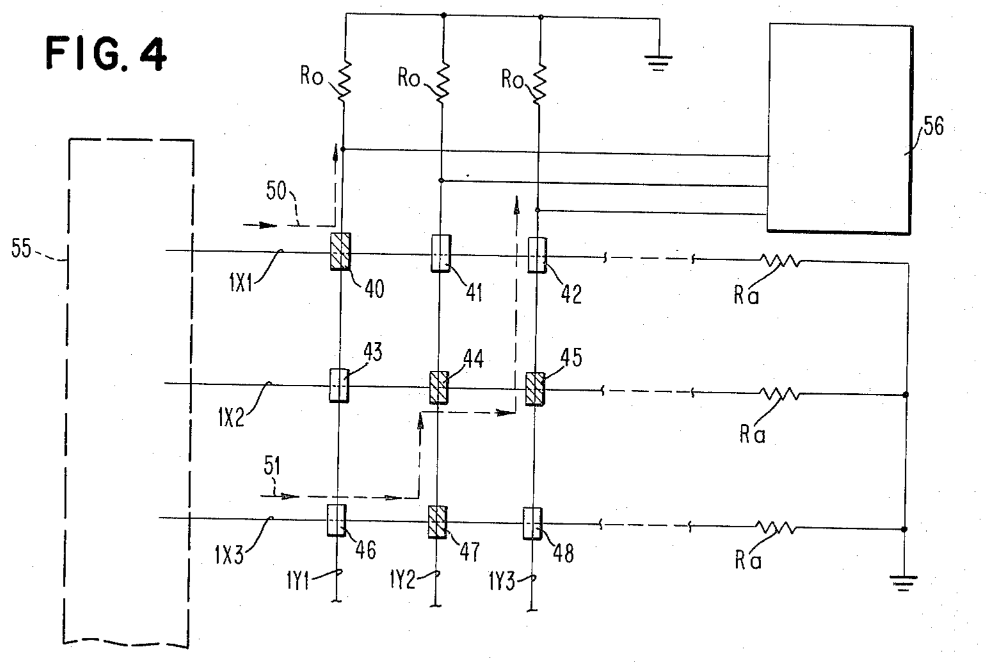
FIGURE 4 is a circuit diagram of a portion of the first embodiment showing various paths through the matrix.

FIGURE 4 shows three horizontal photoresistor matrix lines, 1X1, 1X2, 1X3, and three vertical photoresistor matrix lines, 1Y1, 1Y2, and 1Y3. A direct path through the matrix is exemplified by path 50. Assuming that photoresistor 40 is in the low resistance state, because it is illuminated, a voltage pulse applied to the line 1X1 can be sensed on line 1Y1, indicating that the photoresistor 40 is conductive (i.e., that the punched hole record card above this position has a hole at a particular location).

A "sneak path" through the matrix is exemplified by path 51. Assume that panel A is illuminated and that due to holes in the associated data card the photoresistor path 47, 44 and 45 are illuminated and that they are, therefore, in a conductive state, and further assume that photoresistor 48 is not illuminated. There should be no output upon line 1Y3 when a pulse is applied to line 1X3 since photoresistor 48 is non-conductive; however, if photoresistor paths 47, 44 and 45 are conductive, an output will appear on line 1Y3 through photoresistors 47, 44 and 45, irrespective of whether photoresistor path 48 is conductive. Such paths through the matrix are called "sneak paths."

The result of connecting each horizontal photoresistor matrix line to ground through an attenuating resistor, R$a$, is that "sneak path" signals are attenuated to a greater degree than are the valid output signals. FIGURE 5$a$ shows the equivalent circuit of a direct path through the matrix, and FIGURE 5$b$ shows the equivalent circuit of a "sneak path" through the matrix. In these figures:

R$a$ designates the resistance which connects each horizontal photoresistor matrix line to ground;

R$c$ designates the resistance of each photoresistor when the photoresistor is illuminated; and R$o$ designates the output load resistance which is connected to each vertical photoresistor matrix line.

The equivalent circuit of a direct path through the matrix such as path 50 is shown in FIGURE 5$a$. An interrogating voltage is applied on line 61 and an output appears on line 63. The equivalent circuit of a "sneak path" through the matrix (such as path 51) is shown in FIGURE 5$b$. An interrogating voltage similar to that applied to line 61 is applied to line 62 and a noise signal output appears on line 64.

It can easily be seen that there are more shunt paths between lines 62 and 64 than there are between lines 61 and 63. Hence the noise signals are attenuated more than the information signals. The ratio between noise and information signals is increased by making the magnitude of R$a$ much less than the magnitude of R$o$.

The details of the structure will now be described. These details may take sundry forms and the specific form described below is merely meant to be exemplary. The horizontal photoresistor matrix lines 1X1 to 3X12 (see FIGURES 1 and 2) are copper conductors bonded to substrate 18. Areas of photoresistive material, such as 44, are deposited on these conductors at the index positions. Vertical conductors 1Y1 to 3Y80 are made of transparent conductive material and these conductors are positioned on top of the appropriate areas of photoresistive material.

Electroluminescent panels A through I may be made of a variety of well known electroluminescent materials, such as, those discussed in an article in the IBM Journal of Research and Development by A. O'Connell and B. Narken (Volume 4, No. 4, October 1960, page 426). The material used should have a threshold such that it is not activated when only one of the panel drive lines connected to it has a voltage applied thereto. Each panel A through I fits into the frame member 19.

Circuits 55, which applies interrogating voltages to the various horizontal photoresistor matrix lines, contains gates for selectively applying a voltage to any single horizontal photoresistor matrix line and it further contains an electronic commutator which sequentially applied voltages to the various horizontal matrix lines in either the first, second, or third horizontal group of lines. By sequentially applying voltages to the horizontal lines in one of the horizontal groups while one of the associated panels is active, various words contained on a data card are made to sequentially appear at the appropriate outputs.

Each vertical photoresistor matrix line is connected to an output load resistor R*o* (see FIG. 4). The voltages across these output resistors are sensed by circuit 56.

Circuitry to accomplish the functions which circuits 55 and 56 perform is well known in the art and no further explanation of these circuits is deemed necessary.

Figure 3:
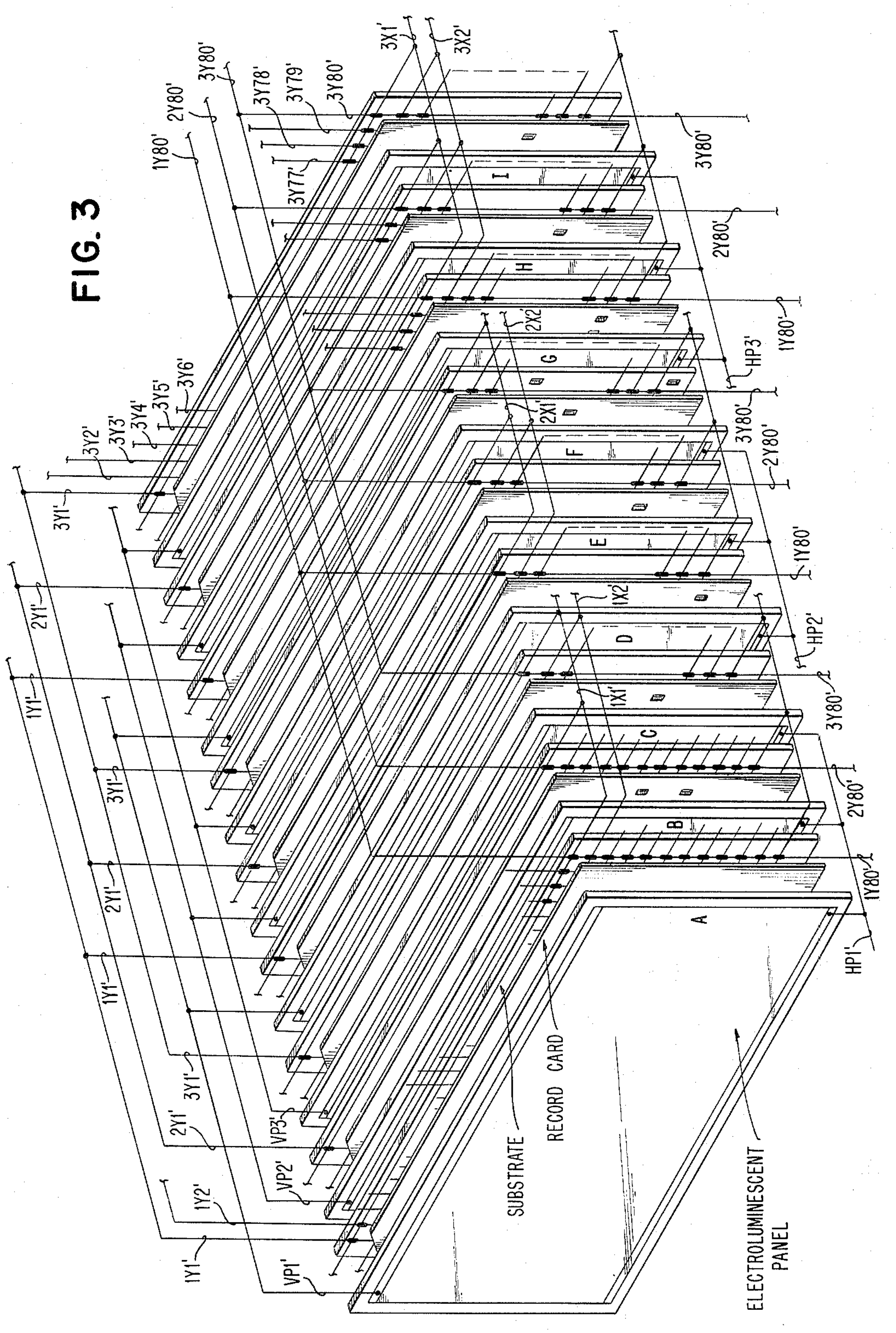
FIGURE 3 is an exploded overall view of a second embodiment of the invention.

A second embodiment of the invention is shown in FIGURE 3. This second embodiment contains essentially the same parts as does the first embodiment; however, these parts are arranged in a more convenient manner. In order to facilitate understanding of the second embodiment the reference numerals used to designate parts in the second embodiment are the same reference numerals that are used to designate like parts in the first embodiment; however, the reference numerals used in the second embodiment are followed by a prime notation.

In the first embodiment each electroluminescent panel, the associated record card, and the associated photoresistor matrix subassembly were said to form a memory cell. (FIGURE 1 is a partial view of one memory cell.) These same memory cells exist in the second embodiment; however, they are arranged in a stacked configuratoin rather than in a flat, side by side configuration.

Electroluminescent panels, A′ through I′, are activated by a matrix of panel drive lines. The first electrode of each electroluminescent panel is connected to one of the panel drive lines in a first set of panel drive lines HP1′, HP2′, HP3′. For example, line HP1′ is connected to the first electrode of panel A′, B′ and C′. The second electrode of each electroluminescent panel is connected to one of the panel drive lines in the second set of panel drive lines VP1′, VP2′, VP3′. For example, line VP1′ is connected to the second electrode of panels A′, D′ and G′. Any electroluminescent panel can, therefore, be activated by the application of a voltage between a selected panel drive line in the second set of panel drive lines.

The photoresistor matrix lines of the various photoresistor matrix subassemblies are interconnected in substantially the same manner in the second embodiment as they are in the first embodiment. However, in the second embodiment the means which interconnect the various subassembly matrix lines in the photoresistor matrix subassemblies appear in a somewhat different form.

For example, connecting line 1X1′ is connected to the top horizontal subassembly photoresistor matrix lines in the first, second and third memory cells. (Note, the first memory cell is that memory cell which includes electroluminescent panel A′, the second memory cell is that memory cell which includes electroluminescent panel B′, etc.) Line 1X12′ is connected to the bottom horizontal subassembly photoresistor matrix line in the first, second and third memory cells; line 2X1′ is connected to the top horizontal subassembly photoresistor matrix line in the first, fourth and seventh memory cells; connecting line 1Y2′ is connected to the second vertical subassembly photoresistor matrix line in the first, fourth and seventh memory cells, etc.

The connecting lines are arranged in two major groups or sets. The first set of connecting lines 1Y1′, 1Y2′, etc., provides connections for the vertical subassembly photoresistor matrix lines and the second set of connecting lines 1X1′, 1X2′, etc., provides connections for the horizontal subassembly photoresistor matrix lines.

The same four dimensional addressing that is a feature of the first embodiment of this invention is a feature of the second embodiment of the invention. That is, the address of any particular bit in the memory is specified by specifying (1) one panel drive line in the first set of panel drive lines, (2) one panel drive line in the second set of panel drive lines, (3) one connecting line in the first set of connecting lines, and (4) one connecting line in the second set of connecting lines. An information word is addressed merely by specifying 1, 2 and 3 above.

Each of the connecting lines in each set of connecting lines in the second embodiment of the invention has an attenuating resistor, R*a′* which connects the line to ground. The action of these attenuating resistors is identical to the action of the attenuating resistors shown in the first embodiment and no further explanation will be given.

For ease in illustration and clarity of understanding one set of panel drive lines (HP1′, HP2′, etc.) is shown in FIG. 3 as extending below the various memory cells, and the other set of panel drive lines (VP1′, VP2′, etc.) is shown as extending above the various memory cells. The actual physical lines for both sets of panel drive lines would, however, be placed above the various memory cells. One set of connecting lines is physically positioned above the various memory cells and the second set of connecting lines is positioned on one side of the various memory cells. In this way there is ample access to insert and remove the various punched hole data cards.

Although the system shown and described herein could be considered as a fixed memory it should be realized that the various punched hole data cards can be changed. The speed of memory systems can be defined by using two parameters, viz. the read-in time, and the read-out time, referring respectively to the amount of time required to store data in the memory and the amount of time required to extract data from the memory. The memory systems of this invention have a relatively long read-in time, since data is read in or stored in the system by mechanically placing punched hole data cards in certain slots. For this reason the memory might be termed a read-only memory; however, it should be realized that the name merely describes the high ratio between read-in and read-out time rather than that this is an absolutely fixed memory having no provision for changing the data stored therein.

While the invention has been particularly shown and described with reference to preferred embodiments thereof, it will be understood by those skilled in the art that various changes in form and details may be made therein without departing from the spirit and scope of the invention.

What is claimed is:

1. An electroluminescent photoresistor memory array comprising in combination a plurality of electroluminescent panels;
   - a matrix of electrical connections to said electroluminescent panels for selectively activating any one of said electroluminescent panels by two dimensional selection;
   - a plurality of photoresistor matrix subassemblies, one adjacent to each of said electroluminescent panels, each of said photoresistor matrix subassemblies comprising
     - a set of horizontal lines,
     - a set of vertical lines, and
     - a separate photoresistive connection between each line in the horizontal set of lines and each line in the vertical set of lines;
   - electrical connections between corresponding lines in each of said photoresistor matrix subassemblies; and
   - a punched hole record mask between each of said electroluminescent panels and the associated photoresistor matrix subassembly.

2. An electroluminescent photoresistor memory comprising in combination a plurality of electroluminescent panels;

a first set of panel drive lines, each panel drive line in said first set of panel drive lines being associated with a plurality of said electroluminescent panels;

a second set of panel drive lines, each panel drive line in said second set of panel drive lines being associated with a plurality of said electroluminescent panels;

means connecting said panel drive lines to the associated panels whereby each panel is activated when an electrical voltage is applied between the associated panel drive lines;

a plurality of photoresistor matrix subassemblies, one of said photoresistor matrix subassemblies being associated with each of said electroluminescent panels, each of said photoresistor matrix subassemblies comprising a first set of subassembly matrix lines, a second set of subassembly matrix lines, and a plurality of photoresistors, each of said photoresistors connected between one line of said first set of subassembly matrix lines and one line of said second set of subassembly matrix lines; when illuminated said photoresistors providing a low resistance path between the associated matrix lines;

a first group of connecting lines, each line in said first group of connecting lines being connected to one subassembly matrix line in said first set of subassembly matrix lines in a plurality of subassembly matrices, a second group of connecting lines, each line in said second group of connecting lines being connected to one subassembly matrix line in said second set of subassembly matrix lines in a plurality of subassembly matrices, and a plurality of data cards each having index positions for receiving information indicia in the form of punched holes, one of said cards being positioned between each electroluminescent panel and the associated photoresistor subassembly matrix, each of said photoresistors being positioned in proximity to an index position of the associated card, whereby activation of an electroluminescent panel will render conductive those photoresistors at index positions where the associated card is punched thereby establishing a low resistance electrical connection between one line in said first group of connecting lines and one line in said second group of connecting lines.

3. An electroluminescent photoresistor memory comprising in combination a plurality of electroluminescent panels;

a first set of panel drive lines, each panel drive line in said first set of panel drive lines being associated with a plurality of said electroluminescent panels;

a second set of panel drive lines, each panel drive line in said second set of panel drive lines being associated with a plurality of said electroluminescent panels;

means connecting said panel drive lines to the associated panels whereby each panel is activated when an electrical voltage is applied between the associated panel drive lines;

a plurality of photoresistor matrix subassemblies, one of said photoresistor matrix subassemblies being associated with each of said electroluminescent panels, each of said photoconductor matrix subassemblies comprising a first set of subassembly matrix lines, a second set of subassembly matrix lines, and a plurality of photoresistors, each of said photoresistors connected between one line of said first set of subassembly matrix lines and one line of said second set of subassembly matrix lines; when illuminated said photoresistors providing a low resistance path between the associated matrix lines;

a plurality of first groups of connecting lines, each first group of connecting lines being associated with a different plurality of photoresistor subassembly matrices, each line in each first group of lines being connected to one matrix line in the first set of matrix lines in the associated plurality of subassembly photoresistor matrices, a plurality of second groups of electrical connecting lines, each second group of connecting lines being associated with a different plurality of subassembly photoresistor matrices, each line in each second group of lines being connected to one matrix line in the second set of matrix lines in the associated plurality of subassembly photoresistor matrices.

a plurality of data cards having indexed positions for receiving information indicia in the form of punched holes, one of said cards being positioned between each electroluminescent panel and the associated photoresistor subassembly matrix;

each of said photoresistors being positioned in proximity to an index position of the associated card, whereby activation of an electroluminescent panel will render conductive those photoresistors at index positions where the associated card is punched thereby establishing a low resistance electrical connection between one line in said first group of connecting lines and one line in said second group of connecting lines.

4. An electroluminescent photoresistor memory comprising in combination a plurality of data cards each having index positions for receiving indicia in the form of punched holes said data cards arranged in a plurality of rows and columns a photoresistor matrix assembly comprising a plurality of groups of vertical matrix lines, one group for each column of data cards a plurality of groups of horizontal matrix lines one group for each row of data cards a plurality of photoresistors, each of said photoresistors providing when illuminated a low resistance connection between a horizontal and a vertical matrix line, a plurality of said photoresistors being associated with each data card, each photoresistor being positioned in proximity to a matrix position of the associated card, a plurality of electroluminescent panels, one for each data card, a first set of panel drive lines, one panel drive line in said first set of panel drive lines being associated with each of said electroluminescent panels, a second set of panel drive lines, one panel drive line in said second set of panel drive lines being associated with each of said electroluminescent panels;

means connecting said panel drive lines to the associated panels whereby said panels are activated when an electrical voltage is applied between the associated panel drive lines, whereby activation of an electroluminescent panel will render conductive those photoresistors at index positions where the associated card is punched, thereby establishing an electrical connection between a horizontal matrix line and a vertical matrix line.

5. An electroluminescent photoresistor memory comprising in combination a plurality of electroluminescent panels;

a first set of panel drive lines, one panel drive line in said first set of panel drive lines being associated with each of said electroluminescent panels;

a second set of panel drive lines, one panel drive line in said second set of panel drive lines being associated with each of said electroluminescent panels;

means connecting said panel drive lines to the associated panels whereby each panel is activated when an electrical voltage is applied between the associated panel drive lines;

a plurality of photoresistor matrix subassemblies, one of said photoresistor matrix subassemblies being associated with each of said electroluminescent panels, each of said photoresistor matrix subassemblies comprising a first set of subassembly matrix lines, a second set of subassembly matrix lines, and a plurality of photoresistors, each of said photoresistors providing when illuminated, a low resistance connection between one line of said first set of subassembly matrix lines and one line of said second set of subassembly matrix lines, said photoresistors providing when dark a high resistance connection between the associated matrix lines a first group of connecting lines, each line in said first group of connecting lines being connected to one subassembly matrix line in said first set of subassembly matrix lines in a plurality of subassembly matrices, a second group of connecting lines, each line in said second group of connecting lines being connected to one subassembly matrix line in said second set of subassembly matrix lines in a plurality of subassembly matrices, and a ground connection a resistive connection between each of said connecting lines and ground, the resistance of said resistive connection being substantially equal to the low resistance of said photoresistors means for selectively applying a voltage between ground and any line in said first group of connecting lines means for sensing the voltage between each of said second group of connecting lines and ground a plurality of data cards having indexed positions for receiving information indicia in the form of punched holes, one of said cards being positioned between each of electroluminescent panel and the associated photoresistor subassembly matrix, each of said photoresistors being positioned in proximity to an index position of the associated card, whereby activation of an electroluminescent panel will illuminate those photoresistors at index positions where the associated card is punched thereby establishing a low resistance electrical connection between one line in said first group of connecting lines and one line in said second group of connecting lines.

6. An electroluminescent photoresistor memory comprising in combination a plurality of electroluminescent panels;

a first set of panel drive lines, each panel drive line in said first set of panel drive lines being associated with a plurality of said electroluminescent panels;

a second set of panel drive lines, each panel drive line in said second set of panel drive lines being associated with a plurality of said electroluminescent panels;

means connecting said panel drive lines to the associated panels whereby each panel is activated when an electrical voltage is applied between the associated panel drive lines;

a plurality of photoresistor matrix subassemblies, one of said photoresistor matrix subassemblies being associated with each of said electroluminescent panels, each of said photoresistor matrix subassemblies comprising a first set of subassembly matrix lines, a second set of subassembly matrix lines, and a plurality of photoresistors, each of said photoresistors connected between one line of said first set of subassembly matrix lines and one line of said second set of subassembly matrix lines;

said photoresistors having a low resistance when illuminated and a high resistance when dark a plurality of first groups of connecting lines, each first group of connecting lines being associated with a a different plurality of photoresistor subassembly matrices, each line in each first group of lines being connected to one matrix line in the first set of matrix lines in the associated plurality of subassembly photoresistor matrices, a plurality of second groups of electrical connecting lines, each second group of connecting lines being associated with a different plurality of subassembly photoresistor matrices, each line in each second group of lines being connected to one matrix line in the second set of matrix lines in the associated plurality of subassembly photoresistor matrices, an attenuating resistor connected to each of said connecting lines means for selectively applying voltages to the lines in said first group of lines means for sensing voltages on said second group of lines a plurality of data cards having indexed positions for receiving information indicia in the form of punched holes, one of said cards being positioned between each electroluminescent panel and the associated photoresistor subassembly matrix;

each of said photoresistors being positioned in proximity to an index position of the associated card whereby activation of an electroluminescent panel will illuminate those photoresistors at index positions where the associated card is punched thereby establishing a low resistance electrical connection between one line in said first group of connecting lines and one line in said second group of connecting lines.

7. An electroluminescent photoresistor memory comprising in combination a plurality of data cards each having index positions for receiving indicia in the form of punched holes, said data cards arranged in a plurality of rows and columns;

a photoresistor matrix assembly comprising, a plurality of groups of vertical matrix lines, one group for each column of data cards;

a plurality of groups of horizontal matrix lines, one group for each row of data cards;

a plurality of photoresistors, one positioned in proximity to each of said index positions, said photoresistor having low resistance when illuminated and a high resistance when dark;

means connecting each of said photoresistors between one of said horizontal matrix lines and one of said vertical matrix lines;

a plurality of electroluminescent panels, one for each data card for selectively illuminating the associated photoresistors an attenuating resistor connected to each of said horizontal matrix lines means for selectively applying signal to said horizontal matrix lines, means for sensing signals on said vertical matrix lines a first set of panel drive lines, each panel drive line in said first set of panel drive lines being associated with a plurality of electroluminescent panels, a second set of panel drive lines, each panel drive line in said second set of panel drive lines being associated with a plurality of electroluminescent panels;

means for connecting said panel drive lines to the associated panels for activating each panel when an electrical voltage is applied between the associated panel drive lines, whereby activation of an electroluminescent panel causes those photoresistors at index positions where the associated card is punched to assume their low resistance state, thereby establishing a low resistance electrical connection between selected horizontal matrix lines and selected vertical matrix lines.

8. A data memory comprising in combination
a plurality of light producing devices
a matrix of electrical connections to said light producing devices, said matrix comprising two sets of panel drive lines connected to said light producing devices whereby any one of said light producing devices may be activated by applying a voltage between a selected line in the first set and a selected line in the second set of drive lines
a plurality of photoresistor matrix subassemblies one adjacent to each of said light producing devices, each of said photoresistors matrix subassemblies comprising
a set of horizontal matrix lines
a set of vertical matrix lines, and
a photoresistive connection between each line in the horizontal set of lines and each line in the vertical set of lines,
electrical connections between corresponding horizontal matrix lines in a plurality of said photoresistor matrix subassemblies; and
electrical connections between corresponding vertical matrix lines in a plurality of said photoresistor matrix subassemblies,
a punched hole record between each of said light producing devices and the associated photoresistor matrix subassembly.

9. A data memory comprising in combination
a plurality of light producing devices
a plurality of photoresistors one positioned in each index position and each having a low resistance when illuminated and a high resistance when dark
a first set of panel drive lines, each panel drive line in said first set of panel drive lines being associated with a plurality of said light producing devices;
a second set of panel drive lines, each panel drive line in said second set of panel drive lines being associated with a plurality of said light producing devices;
means connecting said panel drive lines to the associated panels whereby each panel is activated when an electrical voltage is applied between the associated panel drive lines;
a plurality of photoresistor matrix subassemblies, one of said photoresistor matrix subassemblies being associated with each of said light producing devices, each of said photoresistors matrix subassemblies comprising
a plurality of photoresistors,
a first set of subassembly matrix lines,
a second set of subassembly matrix lines, and
means connecting each one of said photoresistors between one line of said first set of subassemblies matrix lines and one line of second set of subassembly matrix lines
a first group of connecting lines, each line in said first group of connecting lines being connected to one subassembly matrix line in said first set of subassembly matrix lines in a plurality of subassembly matrices,
a second group of connecting lines, each line in said second group of connecting lines being connected to one subassembly matrix line in said second set of subassembly matrix lines in a plurality of subassembly matrices, and
a plurality of data cards each having index positions for receiving information indicia in the form of punched holes, one of said cards being positioned between each light producing device and the associated photoresistor subassembly matrix,
whereby activation of a light producing device illuminates those photoresistors at index position where the associated card is punched, thereby establishing a low resistance electrical connection between one line in said first group of connecting lines and one line in said second group of connecting lines.

References Cited by the Examiner

UNITED STATES PATENTS

| | | | |
|---|---|---|---|
| 1,072,152 | 9/13 | Ocampo | 235—61 |
| 2,727,685 | 12/55 | Wilson | 235—61 |
| 2,859,914 | 11/58 | Blasingame | 235—185 |
| 2,904,626 | 9/59 | Rajchman | 340—174 |
| 3,046,540 | 7/62 | Litz et al. | 340—347 |

OTHER REFERENCES

Hatfield: IBM Technical Disclosure Bulletin, vol. 3, No. 5, page 57, October 1960.

Keller: IBM Technical Disclosure Bulletin, vol. #1, June 1958, page 38.

MALCOLM A. MORRISON, *Primary Examiner.*

WALTER W. BURNS, *Examiner.*